United States Patent
Cha et al.

(10) Patent No.: US 11,825,217 B2
(45) Date of Patent: Nov. 21, 2023

(54) IMAGE SENSING DEVICE

(71) Applicant: SK hynix Inc., Gyeonggi-do (KR)

(72) Inventors: Su Ram Cha, Gyeonggi-do (KR); Jong Heon Kim, Gyeonggi-do (KR); Woo Young Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/707,428

(22) Filed: Mar. 29, 2022

(65) Prior Publication Data

US 2023/0101569 A1    Mar. 30, 2023

(30) Foreign Application Priority Data

Sep. 30, 2021  (KR) .......................... 10-2021-0130312

(51) Int. Cl.
*H04N 25/13* (2023.01)
*H04N 23/84* (2023.01)
*H04N 25/75* (2023.01)
*H04N 25/133* (2023.01)

(52) U.S. Cl.
CPC ......... *H04N 25/135* (2023.01); *H04N 23/843* (2023.01); *H04N 25/13* (2023.01); *H04N 25/133* (2023.01); *H04N 25/75* (2023.01)

(58) Field of Classification Search
CPC .... H04N 23/843; H04N 25/135; H04N 25/75; H04N 25/13; H04N 25/133; H04N 25/766
See application file for complete search history.

(56) References Cited

U.S. PATENT DOCUMENTS

| | | | |
|---|---|---|---|
| 3,971,065 A | 7/1976 | Bayer | |
| 9,451,221 B2 * | 9/2016 | Hirota | .................. H04N 25/135 |
| 9,692,992 B2 | 6/2017 | Wu | |
| 10,855,959 B2 | 12/2020 | Cha et al. | |

(Continued)

FOREIGN PATENT DOCUMENTS

KR    10-2022-0010285 A    1/2022

OTHER PUBLICATIONS

Andrei Frumusanu, The Huawei P8 Preview, AnandTech, Jun. 4, 2015, https://www.anandtech.com/show/9260/the-huawei-p8-review/ 8.

*Primary Examiner* — Lin Ye
*Assistant Examiner* — Chriss S Yoder, III
(74) *Attorney, Agent, or Firm* — IP & T GROUP LLP

(57) ABSTRACT

Disclosed is an image sensing device including a pixel array, wherein the pixel array includes a first sub-pixel array including pixels each having a green filter and disposed in a first diagonal direction, and pixels each having a white filter and disposed in a second diagonal direction, a second sub-pixel array including pixels each having the green filter and disposed in the first diagonal direction, and pixels each having the white filter and disposed in the second diagonal direction, a third sub-pixel array including pixels each having a red filter and disposed in the second diagonal direction, and pixels each having the white filter and disposed in the first diagonal direction, and a fourth sub-pixel array including pixels each having a blue filter and disposed in the second diagonal direction, and pixels each having the white filter and disposed in the first diagonal direction.

19 Claims, 8 Drawing Sheets

(56) References Cited

U.S. PATENT DOCUMENTS

| | | | |
|---|---|---|---|
| 2012/0218426 A1* | 8/2012 | Kaizu | H04N 25/75 |
| | | | 348/241 |
| 2012/0287294 A1* | 11/2012 | Kaizu | H04N 25/59 |
| | | | 348/E5.037 |
| 2014/0253808 A1 | 9/2014 | Tachi | |
| 2016/0191866 A1* | 6/2016 | Onishi | H04N 23/843 |
| | | | 348/270 |

* cited by examiner

| G | R | G | R |
|---|---|---|---|
| B | G | B | G |
| G | R | G | R |
| B | G | B | G |

[Bayer Pattern]

| G | W | W | R |
|---|---|---|---|
| W | G | R | W |
| W | B | G | W |
| B | W | W | G |

[New Pattern]

(B)

| B | G | B | G |
|---|---|---|---|
| G | R | G | R |
| B | G | B | G |
| G | R | G | R |

[Bayer Pattern]

| B | W | W | G |
|---|---|---|---|
| W | B | G | W |
| W | G | R | W |
| G | W | W | R |

[New Pattern]

(C)

| R | G | R | G |
|---|---|---|---|
| G | B | G | B |
| R | G | R | G |
| G | B | G | B |

[Bayer Pattern]

| R | W | W | G |
|---|---|---|---|
| W | R | G | W |
| W | G | B | W |
| G | W | W | B |

[New Pattern]

(D)

| G | B | G | B |
|---|---|---|---|
| R | G | R | G |
| G | B | G | B |
| R | G | R | G |

[Bayer Pattern]

| G | W | W | B |
|---|---|---|---|
| W | G | B | W |
| W | R | G | W |
| R | W | W | G |

[New Pattern]

| G | W | W | W | W | R |
|---|---|---|---|---|---|
| W | G | W | W | R | W |
| W | W | G | R | W | W |
| W | W | B | G | W | W |
| W | B | W | W | G | W |
| B | W | W | W | W | G |

(A)

| B | W | W | W | W | G |
|---|---|---|---|---|---|
| W | B | W | W | G | W |
| W | W | B | G | W | W |
| W | W | G | R | W | W |
| W | G | W | W | R | W |
| G | W | W | W | W | R |

(B)

| R | W | W | W | W | G |
|---|---|---|---|---|---|
| W | R | W | W | G | W |
| W | W | R | G | W | W |
| W | W | G | B | W | W |
| W | G | W | W | B | W |
| G | W | W | W | W | B |

(C)

| G | W | W | W | W | B |
|---|---|---|---|---|---|
| W | G | W | W | B | W |
| W | W | G | B | W | W |
| W | W | R | G | W | W |
| W | R | W | W | G | W |
| R | W | W | W | W | G |

(D)

IMAGE SENSING DEVICE

CROSS-REFERENCE TO RELATED APPLICATION(S)

This application claims priority under 35 U.S.C. § 119 to Korean Patent Application No. 10-2021-0130312, filed on Sep. 30, 2021, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices are devices for capturing images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device capable of generating a monochrome image in a low-contrast mode and a high-contrast mode while generating an optimized color image in the low-contrast mode and the high-contrast mode.

In accordance with an embodiment of the present disclosure, an image sensing device may include: a pixel array having a 4×4 unit pixel structure, wherein the pixel array includes: a first sub-pixel array including first and second pixels each having a green filter and disposed in a first diagonal direction, and third and fourth pixels each having a white filter and disposed in a second diagonal direction that intersects the first diagonal direction; a second sub-pixel array including fifth and sixth pixels each having the green filter and disposed in the first diagonal direction, and seventh and eighth pixels each having the white filter and disposed in the second diagonal direction; a third sub-pixel array including ninth and $10^{th}$ pixels each having a red filter and disposed in the second diagonal direction, and $11^{th}$ and $12^{th}$ pixels each having the white filter and disposed in the first diagonal direction; and a fourth sub-pixel array including $13^{th}$ and $14^{th}$ pixels each having a blue filter and disposed in the second diagonal direction, and $15^{th}$ and $16^{th}$ pixels each having the white filter and disposed in the first diagonal direction.

In accordance with an embodiment of the present disclosure, an image sensing device may include: a pixel array including N×M pixels, where N and M are natural numbers greater than 2, wherein the pixel array includes: first pixels disposed along a first diagonal line and each having a green filter; at least one second pixel having a white filter, at least one third pixel having a red filter and at least one fourth pixel having a blue filter, the second to fourth pixels being disposed along a second diagonal line parallel to the first diagonal line; fifth pixels disposed along a third diagonal line parallel to the second diagonal line and each having the white filter; and at least one sixth pixel having the white filter, at least one seventh pixel having the red filter and at least one eighth pixel having the blue filter, the sixth to eighth pixels being disposed along a fourth diagonal line parallel to the third diagonal line.

In accordance with an embodiment of the present disclosure, an image sensing device may include: a pixel array having a K×K unit pixel structure, where K is a natural number greater than 4, wherein the unit pixel structure includes: first pixels disposed in a first diagonal direction and each having a green filter; second pixels each having a red filter and third pixels each having a blue filter, the second and third pixels being disposed in a second diagonal direction that intersects the first diagonal direction; and fourth pixels each having a white filter and disposed at the other positions except for arrangement positions of the first to third pixels disposed in the first and second diagonal directions.

In accordance with an embodiment of the present disclosure, an image sensing device may include: 4×4 unit pixel arrays each including: first pixels arranged in a first diagonal direction and each having a green filter; second pixels each having a red filter and third pixels each having a blue filter, the second and third pixels being arranged in a second diagonal direction; and fourth pixels arranged in remaining locations other than the first to third pixels and each having a white filter; a readout circuit suitable for generating readout signals based on pixel signals from the unit pixel arrays; a color synthesis module suitable for synthesizing the readout signals according to following equations 1 to 4 to generate an image of a Bayer pattern; and a monochrome synthesis module suitable for synthesizing selected readout signals, which correspond to the fourth pixels among the readout signals, to generate an image of a monochrome pattern:

$$G11 = (P11 + P22) \times \frac{0.5(P12 + P21)}{\sum_{i,j \in ROI} W_{i,j}} \quad \text{[Equation 1]}$$

$$G22 = (P33 + P44) \times \frac{0.5(P34 + P43)}{\sum_{i,j \in ROI} W_{i,j}} \quad \text{[Equation 2]}$$

$$R12 = (P14 + P23) \times \frac{0.5(P13 + P24)}{\sum_{i,j \in ROI} W_{i,j}} \quad \text{[Equation 3]}$$

$$B21 = (P32 + P41) \times \frac{0.5(P31 + P42)}{\sum_{i,j \in ROI} W_{i,j}}, \quad \text{[Equation 4]}$$

wherein: G11, G22, R12 and B21 together represent a unit color array of the Bayer pattern, P11, P22, P33 and P44 represent the readout signals corresponding to the first pixels, P14 and P23 represent the readout signals corresponding to the second pixels, P32 and P41 represent the readout signals corresponding to the third pixels, P12, P21, P34, P43, P13, P24, P31 and P42 represent the read out signals corresponding to the fourth pixels, and $\Sigma_{i,j \in ROI} W_{i,j}$ represents an average of the readout signals, which correspond to the fourth pixels, in a region of interest that is set with respect to each 2×2 sub-pixel array within the unit pixel array.

BRIEF DESCRIPTION OF THE DRAWINGS

FIG. 3 is a set of diagrams illustrating a 4×4 unit pixel structure illustrated in FIG. 2 with their corresponding Bayer patterns in accordance with an embodiment of the present disclosure.

FIG. 4 is a diagram illustrating an 8×8 unit pixel structure obtained by expanding the 4×4 unit pixel structure illustrated in FIG. 3 in accordance with an embodiment of the present disclosure.

FIG. 5 is a diagram illustrating an 8×8 pixel structure obtained by expanding the 4×4 unit pixel structure illustrated in FIG. 3 in accordance with an embodiment of the present disclosure.

FIG. 6 is a diagram illustrating an 8×8 pixel structure obtained by expanding the 4×4 unit pixel structure illustrated in FIG. 3 in accordance with an embodiment of the present disclosure.

FIG. 7 is a diagram illustrating an 8×8 pixel structure obtained by expanding the 4×4 unit pixel structure illustrated in FIG. 3 in accordance with an embodiment of the present disclosure.

FIG. 9 is a diagram illustrating a 6×6 unit pixel structure illustrated in FIG. 8 in accordance with an embodiment of the present disclosure.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when a portion is referred to as being "connected to" or "coupled to" another portion, the portion may be directly connected to or coupled to the another portion, or electrically connected to or coupled to the another portion with one or more portions interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
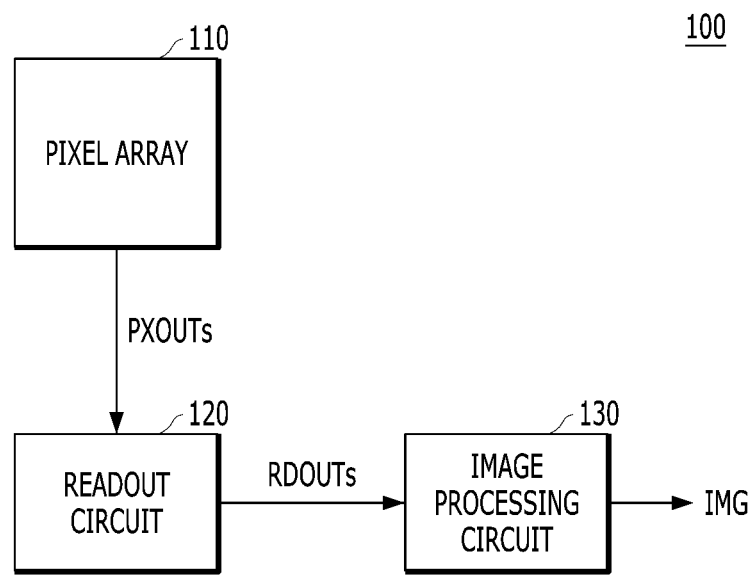
FIG. 1 is a block diagram illustrating an image sensing device in accordance with an embodiment of the present disclosure.

FIG. 1 is a block diagram illustrating an image sensing device 100 in accordance with an embodiment of the present disclosure.

Referring to FIG. 1, the image sensing device 100 may include a pixel array 110, a readout circuit 120 and an image processing circuit 130.

The pixel array 110 may generate pixel signals PXOUTs corresponding to a captured image. Each of the pixel signals PXOUTs may be an analog signal.

The readout circuit 120 may generate image signals RDOUTs on the basis of the pixel signals PXOUTs. Each of the image signals RDOUTs may be a digital signal.

The image processing circuit 130 may generate an image IMG corresponding to the captured image, on the basis of the image signals RDOUTs. The image IMG may have a pattern different from a color filter pattern of the pixel array 110. The color filter pattern of the pixel array 110 may have a new pattern different from a Bayer pattern, and the image IMG may have the Bayer pattern or a monochrome pattern. The new pattern of the pixel array 110 is described in detail below.

Figure 2:
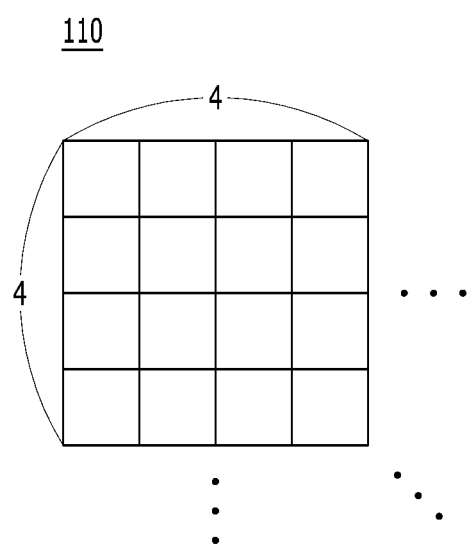
FIG. 2 is a diagram illustrating an example of a pixel array illustrated in FIG. 1 in accordance with an embodiment of the present disclosure.

FIG. 2 is a diagram illustrating an example of the pixel array 110 illustrated in FIG. 1 in accordance with an embodiment of the present disclosure.

Referring to FIG. 2, the pixel array 110 may include M×N pixels arranged at intersections of M rows and N columns, where N and M are natural numbers greater than 2. The pixel array 110 may have a pattern in which a 4×4 unit pixel structure is repeated. That is, 16 pixels may form one group, and each group may have the same pattern (hereinafter referred to as a "new pattern"). The new pattern may substantially refer to the color filter pattern of a color filter array included in the pixel array 110.

The 4×4 unit pixel structure may include first to fourth sub-pixel arrays in a unit of 2×2 pixels. Hereinafter, the sub-pixel array in the unit of 2×2 pixels located on the top left in the 4×4 unit pixel structure is referred to as the "first sub-pixel array", the sub-pixel array in the unit of 2×2 pixels located on the bottom right in the 4×4 unit pixel structure is referred to as the "second sub-pixel array", the sub-pixel array in the unit of 2×2 pixels located on the top right in the 4×4 unit pixel structure is referred to as the "third sub-pixel array", and the sub-pixel array in the unit of 2×2 pixels located on the bottom left in the 4×4 unit pixel structure is referred to as the "fourth sub-pixel array".

FIG. 3 is a set of diagrams illustrating the new pattern illustrated in FIG. 2 with their corresponding Bayer patterns in accordance with an embodiment of the present disclosure. Typically, the Bayer pattern may have a pattern in which 2×2 unit pixels are repeated, and is illustrated in a unit of 4×4 pixels corresponding to the new pattern.

Referring to FIG. 3, the Bayer pattern may be arranged as illustrated in (A) of FIG. 3. For example, in the Bayer pattern in the unit of 2×2 pixels, a pair of pixels each having a green filter G may be disposed in a first diagonal direction descending from left to right, and a pixel having a blue filter B and a pixel having a red filter R may be sequentially disposed in a second diagonal direction ascending from left to right.

In correspondence with the Bayer pattern arranged as illustrated in (A) of FIG. 3, the new pattern may be arranged as follows. In the first sub-pixel array, a pair of pixels each having a green filter G may be disposed in the first diagonal direction, and a pair of pixels each having a white filter W may be disposed in the second diagonal direction. In the second sub-pixel array, a pair of pixels each having a green filter G may be disposed in the first diagonal direction, and a pair of pixels each having a white filter W may be disposed in the second diagonal direction. In the third sub-pixel array, a pair of pixels each having a red filter R may be disposed in the second diagonal direction, and a pair of pixels each having a white filter W may be disposed in the first diagonal direction. In the fourth sub-pixel array, a pair of pixels each having a blue filter B may be disposed in the second diagonal direction, and a pair of pixels each having a white filter W may be disposed in the first diagonal direction. The 4×4 unit pixel structure may include first to fourth pixels disposed in the first diagonal direction and each having the green filter G, fifth and sixth pixels disposed in the second diagonal direction and each having the red filter R, seventh and eighth pixels disposed in the second diagonal direction and each having the blue filter B, and ninth to $16^{th}$ pixels disposed at the other positions except for the arrangement positions of the first to eighth pixels disposed in the first and second diagonal directions and each having the white filter W. The fifth and sixth pixels each having the red filter R may be consecutively disposed on one side of the second diagonal direction, and the seventh and eighth pixels each having the blue filter B may be consecutively disposed on the other side of the second diagonal direction.

The Bayer pattern may be arranged as illustrated in (B) of FIG. 3. For example, in the Bayer pattern in the unit of 2×2 pixels, a pixel having a blue filter B and a pixel having a red filter R may be sequentially disposed in the first diagonal direction, and a pair of pixels each having a green filter G may be disposed in the second diagonal direction.

In correspondence with the Bayer pattern arranged as illustrated in (B) of FIG. 3, the new pattern may be arranged as follows. In the first sub-pixel array, a pair of pixels each having a blue filter B may be disposed in the first diagonal direction, and a pair of pixels each having a white filter W may be disposed in the second diagonal direction. In the second sub-pixel array, a pair of pixels each having a red filter R may be disposed in the first diagonal direction, and a pair of pixels each having a white filter W may be disposed in the second diagonal direction. In the third sub-pixel array, a pair of pixels each having a green filter G may be disposed in the second diagonal direction, and a pair of pixels each having a white filter W may be disposed in the first diagonal direction. In the fourth sub-pixel array, a pair of pixels each having a green filter G may be disposed in the second diagonal direction, and a pair of pixels each having a white filter W may be disposed in the first diagonal direction. The 4×4 unit pixel structure may include first and second pixels disposed in the first diagonal direction and each having the blue filter B, third and fourth pixels disposed in the first diagonal direction and each having the red filter R, fifth to eighth pixels disposed in the second diagonal direction and each having the green filter G, and ninth to $16^{th}$ pixels disposed at the other positions except for the arrangement positions of the first to eighth pixels disposed in the first and second diagonal directions and each having the white filter W. The first and second pixels each having the blue filter B may be consecutively disposed on one side of the first diagonal direction, and the third and fourth pixels each having the red filter R may be consecutively disposed on the other side of the first diagonal direction.

The Bayer pattern may be arranged as illustrated in (C) of FIG. 3. For example, in the Bayer pattern in the unit of 2×2 pixels, a pixel having a red filter R and a pixel having a blue filter B may be sequentially disposed in the first diagonal direction, and a pair of pixels each having a green filter G may be disposed in the second diagonal direction.

In correspondence with the Bayer pattern arranged as illustrated in (C) of FIG. 3, the new pattern may be arranged as follows. In the first sub-pixel array, a pair of pixels each having a red filter R may be disposed in the first diagonal direction, and a pair of pixels each having a white filter W may be disposed in the second diagonal direction. In the second sub-pixel array, a pair of pixels each having a blue filter B may be disposed in the first diagonal direction, and a pair of pixels each having a white filter W may be disposed in the second diagonal direction. In the third sub-pixel array, a pair of pixels each having a green filter R may be disposed in the second diagonal direction, and a pair of pixels each having a white filter W may be disposed in the first diagonal direction. In the fourth sub-pixel array, a pair of pixels each having a green filter G may be disposed in the second diagonal direction, and a pair of pixels each having a white filter W may be disposed in the first diagonal direction. The 4×4 unit pixel structure may include first and second pixels disposed in the first diagonal direction and each having the red filter R, third and fourth pixels disposed in the first diagonal direction and each having the blue filter B, fifth to eighth pixels disposed in the second diagonal direction and each having the green filter G, and ninth to $16^{th}$ pixels disposed at the other positions except for the arrangement positions of the first to eighth pixels disposed in the first and second diagonal directions and each having the white filter W. The first and second pixels each having the red filter R may be consecutively disposed on one side of the first diagonal direction, and the third and fourth pixels each having the blue filter B may be consecutively disposed on the other side of the first diagonal direction.

The Bayer pattern may be arranged as illustrated in (D) of FIG. 3. For example, in the Bayer pattern in the unit of 2×2 pixels, a pair of pixels each having a green filter G may be disposed in the first diagonal direction, and a pixel having a red filter R and a pixel having a blue filter B may be sequentially disposed in the second diagonal direction.

In correspondence with the Bayer pattern arranged as illustrated in (D) of FIG. 3, the new pattern may be arranged as follows. In the first sub-pixel array, a pair of pixels each having a green filter G may be disposed in the first diagonal direction, and a pair of pixels each having a white filter W may be disposed in the second diagonal direction. In the second sub-pixel array, a pair of pixels each having a green filter G may be disposed in the first diagonal direction, and a pair of pixels each having a white filter W may be disposed in the second diagonal direction. In the third sub-pixel array, a pair of pixels each having a blue filter B may be disposed in the second diagonal direction, and a pair of pixels each having a white filter W may be disposed in the first diagonal direction. In the fourth sub-pixel array, a pair of pixels each having a red filter R may be disposed in the second diagonal direction, and a pair of pixels each having a white filter W may be disposed in the first diagonal direction. The 4×4 unit pixel structure may include first to fourth pixels disposed in the first diagonal direction and each having the green filter G, fifth and sixth pixels disposed in the second diagonal direction and each having the blue filter B, seventh and eighth pixels disposed in the second diagonal direction and each having the red filter R, and ninth to $16^{th}$ pixels disposed at the other positions except for the arrangement positions of the first to eighth pixels disposed in the first and second diagonal directions and each having the white filter W. The fifth and sixth pixels each having the blue filter B may be consecutively disposed on one side of the second diagonal direction, and the seventh and eighth pixels each having the red filter R may be consecutively disposed on the other side of the second diagonal direction.

Figures 4, 5:
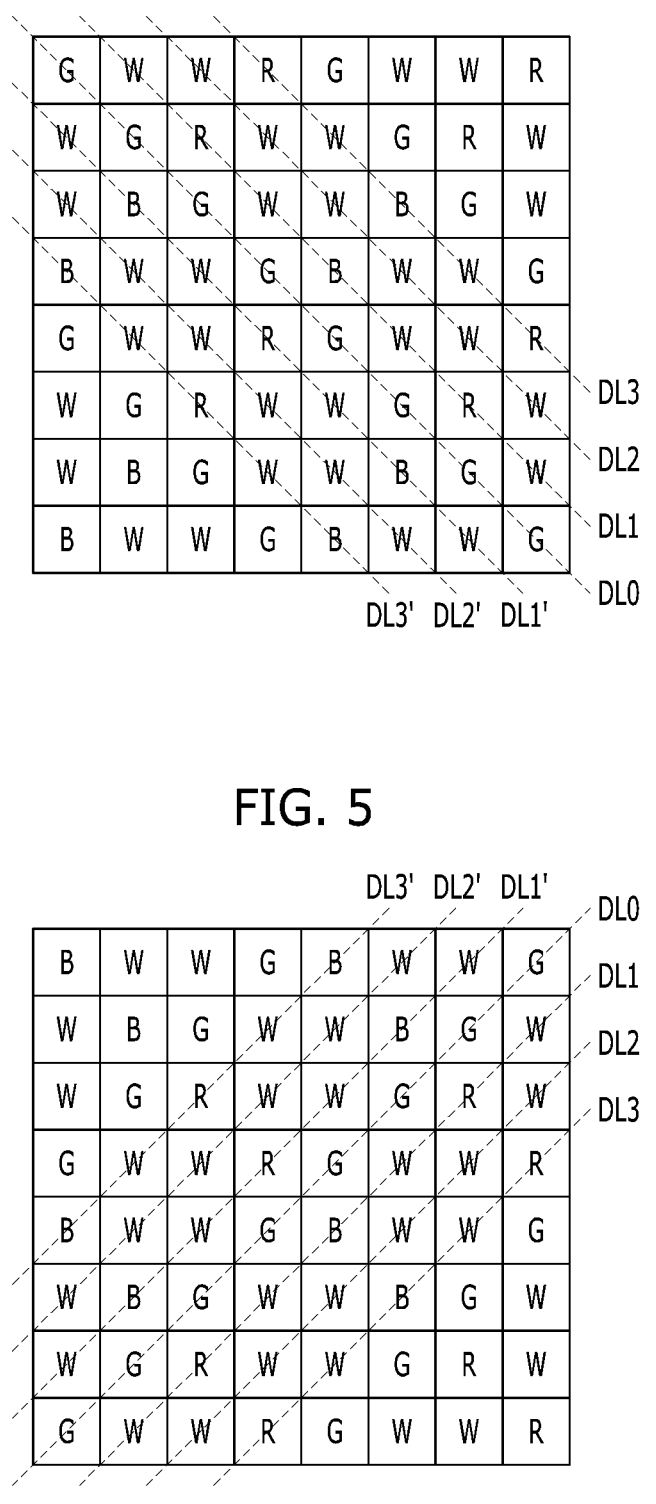

FIG. 4 is a diagram illustrating the example of (A) in FIG. 3 of the new pattern corresponding to the 4×4 unit pixel structure illustrated in FIG. 3 expanded to an 8×8 pixel structure in accordance with an embodiment of the present disclosure.

Referring to FIG. 4, the pixel array 110 according to the example of (A) in FIG. 3 may include pixels arranged along first to seventh diagonal lines DL0 to DL3 and DL1' to DL3'. The first diagonal line DL0 may extend in the first diagonal direction. The second diagonal line DL1 may be adjacent to the second diagonal direction on the basis of the first diagonal line DL0, and extend parallel to the first diagonal line DL0. The third diagonal line DL2 may be adjacent to the second diagonal direction on the basis of the second diagonal line DL1, and extend parallel to the second diagonal line DL1. The fourth diagonal line DL3 may be adjacent to the second diagonal direction on the basis of the third diagonal line DL2, and extend parallel to the third diagonal line DL2. The fifth diagonal line DL1' may be adjacent to an opposite direction of the second diagonal direction on the basis of the first diagonal line DL0, and extend parallel to the first diagonal line DL0. The sixth diagonal line DL2' may be adjacent to the opposite direction on the basis of the fifth diagonal line DL1', and extend parallel to the fifth diagonal line DL1'. The seventh diagonal line DL3' may be adjacent to the opposite direction on the basis of the sixth diagonal line DL2', and extend parallel to the sixth diagonal line DL2'.

The pixel array 110 may include first pixels disposed along the first diagonal line DL0 and each having a green filter G. The pixel array 110 may include second pixels each having a white filter W, third pixels each having a red filter R, and four pixels each having a blue filter B, the second to fourth pixels being disposed along the second diagonal line DL1. The second to fourth pixels may be disposed in the order of a pixel having the white filter W, a pixel having the red filter R, a pixel having the white filter W and a pixel having the blue filter B. The pixel array 110 may include fifth pixels disposed along the third diagonal line DL2 and each having a white filter W. The pixel array 110 may include sixth pixels each having a red filter R, seventh pixels each having a white filter W and eighth pixels each having a blue filter B, the sixth to eighth pixels being disposed along the fourth diagonal line DL3. The sixth to eighth pixels may be disposed in the order of a pixel having the red filter R, a pixel having the white filter W, a pixel having the blue filter B and a pixel having the white filter W.

The pixel array 110 may include ninth pixels each having a white filter W, $10^{th}$ pixels each having a blue filter B and $11^{th}$ pixels each having a red filter R, the ninth to $11^{th}$ pixels being disposed along the fifth diagonal line DL1'. The ninth to $11^{th}$ pixels may be disposed in the order of a pixel having the white filter W, a pixel having the blue filter B, a pixel having the white filter W and a pixel having the red filter R. The pixel array 110 may include $12^{th}$ pixels disposed along the sixth diagonal line DL2' and each having a white filter W. The pixel array 110 may include $13^{th}$ pixels each having a blue filter B, $14^{th}$ pixels each having a white filter W and $15^{th}$ pixels each having a red filter R, the $13^{th}$ to $15^{th}$ pixels being disposed along the seventh diagonal line DL3'. The $13^{th}$ to $15^{th}$ pixels may be disposed in the order of a pixel having the blue filter B, a pixel having the white filter W, a pixel having the red filter R and a pixel having the white filter W.

FIG. 5 is a diagram illustrating the example of (B) in FIG. 3 of the new pattern corresponding to the 4×4 unit pixel structure illustrated in FIG. 3 expanded to an 8×8 pixel structure in accordance with an embodiment of the present disclosure.

Referring to FIG. 5, the pixel array 110 according to the example of (B) in FIG. 3 may include pixels arranged along first to seventh diagonal lines DL0 to DL3 and DL1' to DL3'. The first diagonal line DL0 may extend in the second diagonal direction. The second diagonal line DL1 may be adjacent to the first diagonal direction on the basis of the first diagonal line DL0, and extend parallel to the first diagonal line DL0. The third diagonal line DL2 may be adjacent to the first diagonal direction on the basis of the second diagonal line DL1, and extend parallel to the second diagonal line DL1. The fourth diagonal line DL3 may be adjacent to the first diagonal direction on the basis of the third diagonal line DL2, and extend parallel to the third diagonal line DL2. The fifth diagonal line DL1' may be adjacent to an opposite direction of the first diagonal direction on the basis of the first diagonal line DL0, and extend parallel to the first diagonal line DL0. The sixth diagonal line DL2' may be adjacent to the opposite direction on the basis of the fifth diagonal line DL1', and extend parallel to the fifth diagonal line DL1'. The seventh diagonal line DL3' may be adjacent to the opposite direction on the basis of the sixth diagonal line DL2', and extend parallel to the sixth diagonal line DL2'.

The pixel array 110 may include first pixels disposed along the first diagonal line DL0 and each having a green filter G. The pixel array 110 may include second pixels each having a white filter W, third pixels each having a red filter R, and four pixels each having a blue filter B, the second to fourth pixels being disposed along the second diagonal line DL1. The second to fourth pixels may be disposed in the order of a pixel having the white filter W, a pixel having the red filter R, a pixel having the white filter W and a pixel having the blue filter B. The pixel array 110 may include fifth pixels disposed along the third diagonal line DL2 and each having a white filter W. The pixel array 110 may include sixth pixels each having a red filter R, seventh pixels each having a white filter W and eighth pixels each having a blue filter B, the sixth to eighth pixels being disposed along the fourth diagonal line DL3. The sixth to eighth pixels may be disposed in the order of a pixel having the red filter R, a pixel having the white filter W, a pixel having the blue filter B and a pixel having the white filter W.

The pixel array 110 may include ninth pixels each having a white filter W, $10^{th}$ pixels each having a blue filter B and $11^{th}$ pixels each having a red filter R, the ninth to $11^{th}$ pixels being disposed along the fifth diagonal line DL1'. The ninth to $11^{th}$ pixels may be disposed in the order of a pixel having the white filter W, a pixel having the blue filter B, a pixel having the white filter W and a pixel having the red filter R. The pixel array 110 may include $12^{th}$ pixels disposed along the sixth diagonal line DL2' and each having a white filter W. The pixel array 110 may include $13^{th}$ pixels each having a blue filter B, $14^{th}$ pixels each having a white filter W and $15^{th}$ pixels each having a red filter R, the $13^{th}$ to $15^{th}$ pixels being disposed along the seventh diagonal line DL3'. The $13^{th}$ to $15^{th}$ pixels may be disposed in the order of a pixel having the blue filter B, a pixel having the white filter W, a pixel having the red filter R and a pixel having the white filter W.

Figures 6, 7:
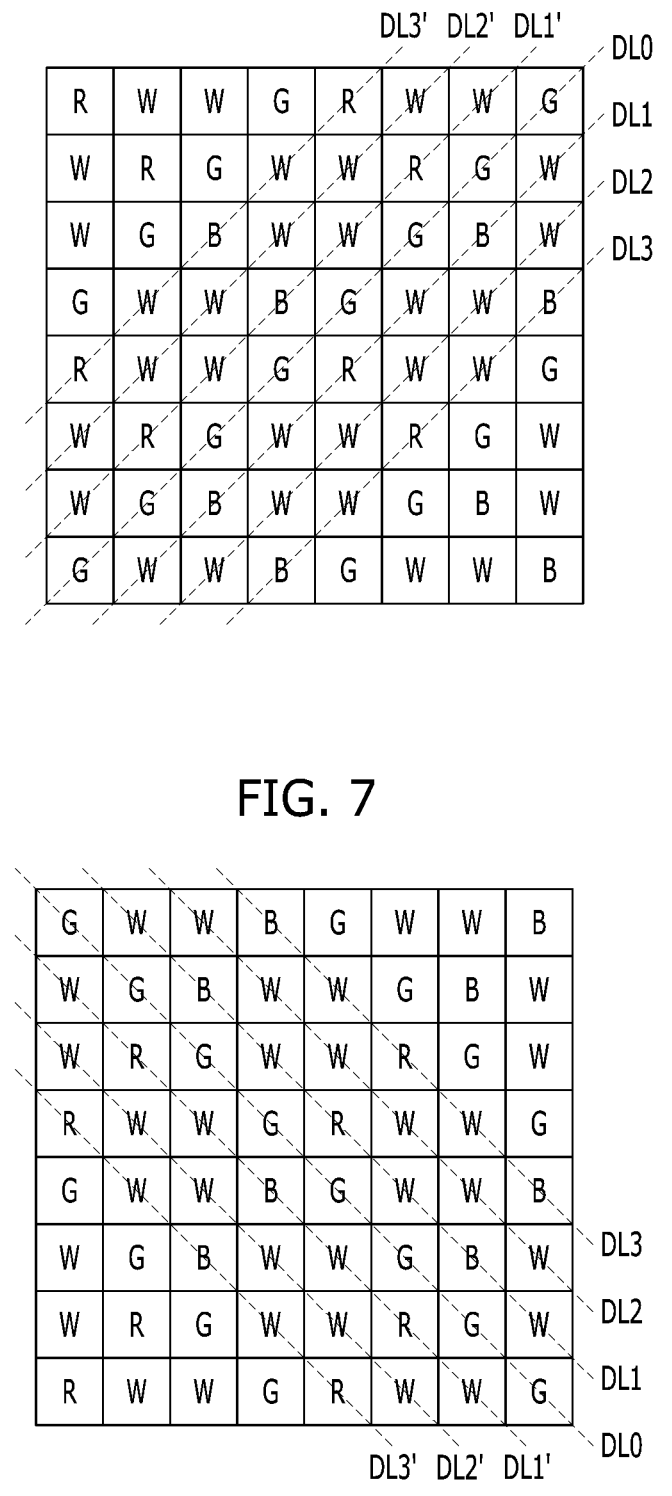

FIG. 6 is a diagram illustrating the example of (C) in FIG. 3 of the new pattern corresponding to the 4×4 unit pixel structure illustrated in FIG. 3 expanded to an 8×8 pixel structure in accordance with an embodiment of the present disclosure.

Referring to FIG. 6, the pixel array 110 according to the example of (C) in FIG. 3 may include pixels arranged along first to seventh diagonal lines DL0 to DL3 and DL1' to DL3'. The first diagonal line DL0 may extend in the second diagonal direction. The second diagonal line DL1 may be adjacent to the first diagonal direction on the basis of the first diagonal line DL0, and extend parallel to the first diagonal line DL0. The third diagonal line DL2 may be adjacent to the first diagonal direction on the basis of the second diagonal line DL1, and extend parallel to the second diagonal line DL1. The fourth diagonal line DL3 may be adjacent to the first diagonal direction on the basis of the third diagonal line DL2, and extend parallel to the third diagonal line DL2. The fifth diagonal line DL1' may be adjacent to an opposite direction of the first diagonal direction on the basis of the first diagonal line DL0, and extend parallel to the first diagonal line DL0. The sixth diagonal line DL2' may be adjacent to the opposite direction on the basis of the fifth diagonal line DL1', and extend parallel to the fifth diagonal line DL1'. The seventh diagonal line DL3' may be adjacent to the opposite direction on the basis of the sixth diagonal line DL2', and extend parallel to the sixth diagonal line DL2'.

The pixel array 110 may include first pixels disposed along the first diagonal line DL0 and each having a green filter G. The pixel array 110 may include second pixels each having a white filter W, third pixels each having a blue filter B, and four pixels each having a red filter R, the second to fourth pixels being disposed along the second diagonal line DL1. The second to fourth pixels may be disposed in the order of a pixel having the white filter W, a pixel having the blue filter B, a pixel having the white filter W and a pixel having the red filter R. The pixel array 110 may include fifth pixels disposed along the third diagonal line DL2 and each having a white filter W. The pixel array 110 may include sixth pixels each having a blue filter B, seventh pixels each having a white filter W and eighth pixels each having a red filter R, the sixth to eighth pixels being disposed along the fourth diagonal line DL3. The sixth to eighth pixels may be disposed in the order of a pixel having the blue filter B, a pixel having the white filter W, a pixel having the red filter R and a pixel having the white filter W.

The pixel array 110 may include ninth pixels each having a white filter W, $10^{th}$ pixels each having a red filter R and $11^{th}$ pixels each having a blue filter B, the ninth to $11^{th}$ pixels being disposed along the fifth diagonal line DL1'. The ninth to $11^{th}$ pixels may be disposed in the order of a pixel having the white filter W, a pixel having the red filter R, a pixel having the white filter W and a pixel having the blue filter B. The pixel array 110 may include $12^{th}$ pixels disposed along the sixth diagonal line DL2' and each having a white filter W. The pixel array 110 may include $13^{th}$ pixels each having a red filter R, $14^{th}$ pixels each having a white filter W and $15^{th}$ pixels each having a blue filter B, the $13^{th}$ to $15^{th}$ pixels being disposed along the seventh diagonal line DL3'. The $13^{th}$ to $15^{th}$ pixels may be disposed in the order of a pixel having the red filter R, a pixel having the white filter W, a pixel having the blue filter B and a pixel having the white filter W.

FIG. 7 is a diagram illustrating the example of (D) in FIG. 3 of the new pattern corresponding to the 4×4 unit pixel structure illustrated in FIG. 3 expanded to an 8×8 pixel structure, in accordance with an embodiment of the present disclosure.

Referring to FIG. 7, the pixel array 110 according to the example of (D) in FIG. 3 may include pixels arranged along first to seventh diagonal lines DL0 to DL3 and DL1' to DL3'. The first diagonal line DL0 may extend in the first diagonal direction. The second diagonal line DL1 may be adjacent to the second diagonal direction on the basis of the first diagonal line DL0, and extend parallel to the first diagonal line DL0. The third diagonal line DL2 may be adjacent to the second diagonal direction on the basis of the second diagonal line DL1, and extend parallel to the second diagonal line DL1. The fourth diagonal line DL3 may be adjacent to the second diagonal direction on the basis of the third diagonal line DL2, and extend parallel to the third diagonal line DL2. The fifth diagonal line DL1' may be adjacent to an opposite direction of the second diagonal direction on the basis of the first diagonal line DL0, and extend parallel to the first diagonal line DL0. The sixth diagonal line DL2' may be adjacent to the opposite direction on the basis of the fifth diagonal line DL1', and extend parallel to the fifth diagonal line DL1'. The seventh diagonal line DL3' may be adjacent to the opposite direction on the basis of the sixth diagonal line DL2', and extend parallel to the sixth diagonal line DL2'.

The pixel array 110 may include first pixels disposed along the first diagonal line DL0 and each having a green filter G. The pixel array 110 may include second pixels each having a white filter W, third pixels each having a blue filter B, and four pixels each having a red filter R, the second to fourth pixels being disposed along the second diagonal line DL1. The second to fourth pixels may be disposed in the order of a pixel having the white filter W, a pixel having the blue filter B, a pixel having the white filter W and a pixel having the red filter R. The pixel array 110 may include fifth pixels disposed along the third diagonal line DL2 and each having a white filter W. The pixel array 110 may include sixth pixels each having a blue filter B, seventh pixels each having a white filter W and eighth pixels each having a red filter R, the sixth to eighth pixels being disposed along the fourth diagonal line DL3. The sixth to eighth pixels may be disposed in the order of a pixel having the blue filter B, a pixel having the white filter W, a pixel having the red filter R and a pixel having the white filter W.

The pixel array 110 may include ninth pixels each having a white filter W, $10^{th}$ pixels each having a red filter R and $11^{th}$ pixels each having a blue filter B, the ninth to $11^{th}$ pixels being disposed along the fifth diagonal line DL1'. The ninth to $11^{th}$ pixels may be disposed in the order of a pixel having the white filter W, a pixel having the red filter R, a pixel having the white filter W and a pixel having the blue filter B. The pixel array 110 may include $12^{th}$ pixels disposed along the sixth diagonal line DL2' and each having a white filter W. The pixel array 110 may include $13^{th}$ pixels each having a red filter R, $14^{th}$ pixels each having a white filter W and $15^{th}$ pixels each having a blue filter B, the $13^{th}$ to $15^{th}$ pixels being disposed along the seventh diagonal line DL3'. The $13^{th}$ to $15^{th}$ pixels may be disposed in the order of a pixel having the red filter R, a pixel having the white filter W, a pixel having the blue filter B and a pixel having the white filter W.

Although the pixel array 110 having the 4×4 unit pixel structure is described as an example in an embodiment, the present disclosure is not necessarily limited thereto, and various embodiments may include the pixel array 110 having a K×K unit pixel structure, where K is a natural number greater than 4.

Figure 8:
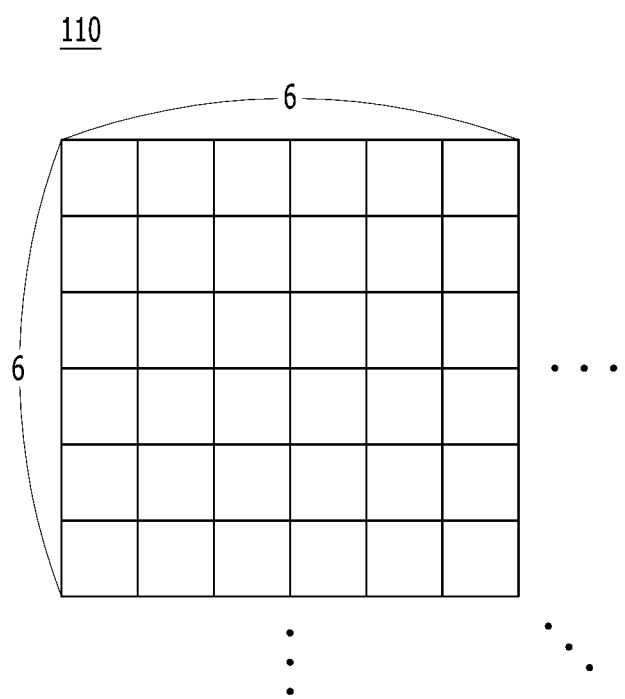
FIG. 8 is a diagram illustrating another example of the pixel array illustrated in FIG. 1 in accordance with an embodiment of the present disclosure.

FIG. 8 is a diagram illustrating another example of the pixel array 110 illustrated in FIG. 1 in accordance with an embodiment of the present disclosure.

Referring to FIG. 8, the pixel array 110 may include M×N pixels arranged at intersections of M rows and N columns, where N and M are natural numbers greater than 2. The pixel array 110 may have a pattern in which a 6×6 unit pixel structure is repeated. That is, 36 pixels may form one group, and each group may have the same pattern. This same pattern may substantially refer to the color filter pattern of a color filter array included in the pixel array 110.

The 6×6 unit pixel structure may include first to fourth sub-pixel arrays in a unit of 3×3 pixels. Hereinafter, the sub-pixel array in the unit of 3×3 pixels located on the top left in the 6×6 unit pixel structure is referred to as the "first sub-pixel array", the sub-pixel array in the unit of 3×3 pixels located on the bottom right in the 6×6 unit pixel structure is referred to as the "second sub-pixel array", the sub-pixel array in the unit of 3×3 pixels located on the top right in the 6×6 unit pixel structure is referred to as the "third sub-pixel array", and the sub-pixel array in the unit of 3×3 pixels located on the bottom left in the 6×6 unit pixel structure is referred to as the "fourth sub-pixel array".

FIG. 9 is a diagram illustrating the same pattern illustrated in FIG. 8 in accordance with an embodiment of the present disclosure.

Referring to FIG. 9, the same pattern may have four forms.

As illustrated in (A) of FIG. 9, the first sub-pixel array may include first to third pixels disposed in the first diagonal direction and each having a green filter G, and fourth to ninth pixels disposed at the other positions and each having a white filter W. The second sub-pixel array may include $10^{th}$ to $12^{th}$ pixels disposed in the first diagonal direction and each having a green filter G, and $13^{th}$ to $18^{th}$ pixels disposed at the other positions and each having a white filter W. The third sub-pixel array may include $19^{th}$ to $21^{st}$ pixels disposed in the second diagonal direction and each having a red filter R, and $22^{nd}$ to $27^{th}$ pixels disposed at the other positions and each having a white filter W. The fourth sub-pixel array may include $28^{th}$ to $30^{th}$ pixels disposed in the second diagonal direction and each having a blue filter B, and $31^{st}$ to $36^{th}$ pixels disposed at the other positions and each having a white filter W. The 6×6 unit pixel structure may include the first to third pixels and $10^{th}$ to $12^{th}$ pixels disposed in the first diagonal direction and each having the green filter G, the $19^{th}$ to $21^{st}$ pixels disposed in the second diagonal direction and each having the red filter R, the $28^{th}$ to $30^{th}$ pixels disposed in the second diagonal direction and each having the blue filter B, and the fourth to ninth, $13^{th}$ to $18^{th}$, $22^{nd}$ to $27^{th}$ and $31^{st}$ to $36^{th}$ pixels each having the white filter W and disposed at the other positions except for the arrangement positions of the pixels disposed in the first diagonal direction and the second diagonal direction. The $19^{th}$ to $21^{st}$ pixels each having the red filter R may be consecutively disposed on one side of the second diagonal direction, and the $28^{th}$ to $30^{th}$ pixels each having the blue filter B may be consecutively disposed on the other side of the second diagonal direction.

As illustrated in (B) of FIG. 9, the first sub-pixel array may include first to third pixels disposed in the first diagonal direction and each having a blue filter B, and fourth to ninth pixels disposed at the other positions and each having a white filter W. The second sub-pixel array may include $10^{th}$ to $12^{th}$ pixels disposed in the first diagonal direction and each having a red filter R, and $13^{th}$ to $18^{th}$ pixels disposed at the other positions and each having a white filter W. The third sub-pixel array may include $19^{th}$ to $21^{st}$ pixels disposed in the second diagonal direction and each having a green filter G, and $22^{nd}$ to $27^{th}$ pixels disposed at the other positions and each having a white filter W. The fourth sub-pixel array may include $28^{th}$ to $30^{th}$ pixels disposed in the second diagonal direction and each having a green filter G, and $31^{st}$ to $36^{th}$ pixels disposed at the other positions and each having a white filter W. The 6×6 unit pixel structure may include the first to third pixels disposed in the first diagonal direction and each having the blue filter B, the $10^{th}$ to $12^{th}$ pixels disposed in the first diagonal direction and each having the red filter R, the $19^{th}$ to $21^{st}$ pixels and $28^{th}$ to $30^{th}$ pixels disposed in the second diagonal direction and each having the green filter G, and the fourth to ninth, $13^{th}$ to $18^{th}$, $22^{nd}$ to $27^{th}$ and $31^{st}$ to $36^{th}$ pixels each having the white filter W and disposed at the other positions except for the arrangement positions of the pixels disposed in the first diagonal direction and the second diagonal direction. The first to third pixels each having the blue filter B may be consecutively disposed on one side of the first diagonal direction, and the $10^{th}$ to $12^{th}$ pixels each having the red filter R may be consecutively disposed on the other side of the first diagonal direction.

As illustrated in (C) of FIG. 9, the first sub-pixel array may include first to third pixels disposed in the first diagonal direction and each having a red filter R, and fourth to ninth pixels disposed at the other positions and each having a white filter W. The second sub-pixel array may include $10^{th}$ to $12^{th}$ pixels disposed in the first diagonal direction and each having a blue filter B, and $13^{th}$ to $18^{th}$ pixels disposed at the other positions and each having a white filter W. The third sub-pixel array may include $19^{th}$ to $21^{st}$ pixels disposed in the second diagonal direction and each having a green filter G, and $22^{nd}$ to $27^{th}$ pixels disposed at the other positions and each having a white filter W. The fourth sub-pixel array may include $28^{th}$ to $30^{th}$ pixels disposed in the second diagonal direction and each having a green filter G, and $31^{st}$ to $36^{th}$ pixels disposed at the other positions and each having a white filter W. The 6×6 unit pixel structure may include the first to third pixels disposed in the first diagonal direction and each having the red filter R, the $10^{th}$ to $12^{th}$ pixels disposed in the first diagonal direction and each having the blue filter B, the $19^{th}$ to $21^{st}$ pixels and $28^{th}$ to $30^{th}$ pixels disposed in the second diagonal direction and each having the green filter G, and the fourth to ninth, $13^{th}$ to $18^{th}$, $22^{nd}$ to $27^{th}$ and $31^{st}$ to $36^{th}$ pixels each having the white filter W and disposed at the other positions except for the arrangement positions of the pixels disposed in the first diagonal direction and the second diagonal direction. The first to third pixels each having the red filter R may be consecutively disposed on one side of the first diagonal direction, and the $10^{th}$ to $12^{th}$ pixels each having the blue filter B may be consecutively disposed on the other side of the first diagonal direction.

As illustrated in (D) of FIG. 9, the first sub-pixel array may include first to third pixels disposed in the first diagonal direction and each having a green filter G, and fourth to ninth pixels disposed at the other positions and each having a white filter W. The second sub-pixel array may include $10^{th}$ to $12^{th}$ pixels disposed in the first diagonal direction and each having a green filter G, and $13^{th}$ to $18^{th}$ pixels disposed at the other positions and each having a white filter W. The third sub-pixel array may include $19^{th}$ to $21^{st}$ pixels disposed in the second diagonal direction and each having a blue filter B, and $22^{nd}$ to $27^{th}$ pixels disposed at the other positions and each having a white filter W. The fourth sub-pixel array may include $28^{th}$ to $30^{th}$ pixels disposed in the second diagonal direction and each having a red filter R, and 31st to 36th pixels disposed at the other positions and each having a white filter W. The 6×6 unit pixel structure may include the first to third pixels and 10th to 12th pixels disposed in the first diagonal direction and each having the green filter G, the 19th to 21st pixels disposed in the second diagonal direction and each having the blue filter B, the 28th to 30th pixels disposed in the second diagonal direction and each having the red filter R, and the fourth to ninth, 13th to 18th, 22nd to 27th and 31st to 36th pixels each having the white filter W and disposed at the other positions except for the arrangement positions of the pixels disposed in the first diagonal direction and the second diagonal direction. The 19th to 21st pixels each having the blue filter B may be consecutively disposed on one side of the second diagonal direction, and the 28th to 30th pixels each having the red filter R may be consecutively disposed on the other side of the second diagonal direction.

Figure 10:
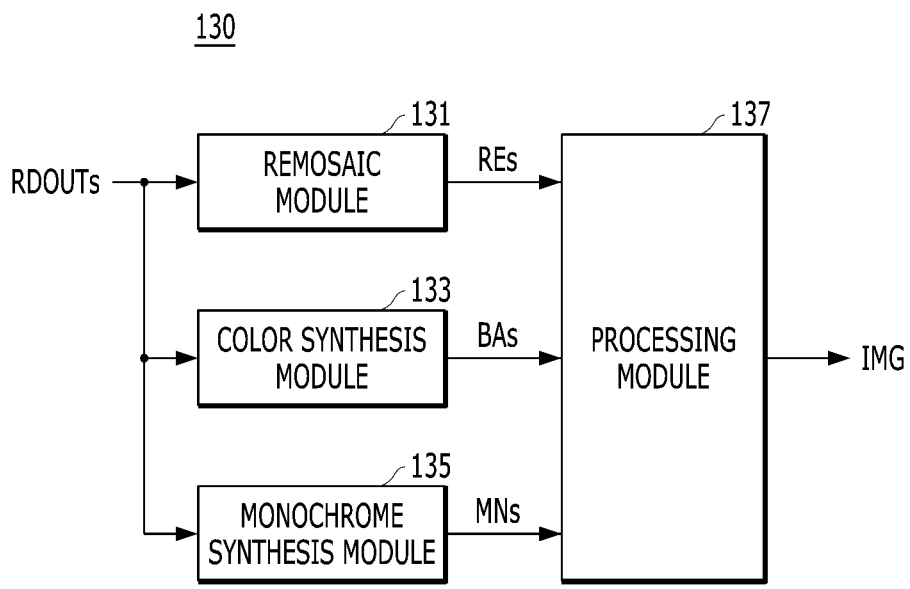
FIG. 10 is a block diagram illustrating an image processing circuit illustrated in FIG. 1 in accordance with an embodiment of the present disclosure.

FIG. 10 is a block diagram illustrating the image processing circuit 130 illustrated in FIG. 1 in accordance with an embodiment of the present disclosure.

Referring to FIG. 10, the image processing circuit 130 may include a remosaic module 131, a color synthesis (or summation) module 133, a monochrome synthesis module 135 and a processing module 137.

The remosaic module 131 may be enabled in a remosaic operation mode. The remosaic module 131 may operate in a high-contrast mode and a low-contrast mode, but it may be more advantageous that the remosaic module 131 operates in the high-contrast mode. The remosaic module 131 may generate remosaic signals REs corresponding to the Bayer pattern, on the basis of readout signals RDOUTs. For example, the remosaic module 131 may convert first readout signals corresponding to the first sub-pixel array into first remosaic signals corresponding to the Bayer pattern, convert second readout signals corresponding to the second sub-pixel array into second remosaic signals corresponding to the Bayer pattern, convert third readout signals corresponding to the third sub-pixel array into third remosaic signals corresponding to the Bayer pattern, and convert fourth readout signals corresponding to the fourth sub-pixel array into fourth remosaic signals corresponding to the Bayer pattern.

The color synthesis module 133 may be enabled in a color synthesis operation mode. The color synthesis module 133 may operate in a high-contrast mode and a low-contrast mode, but it may be more advantageous that the color synthesis module 133 operates in the low-contrast mode. The color synthesis module 133 may generate color synthesis signals BAs corresponding to the Bayer pattern, on the basis of the first to fourth readout signals. For example, the color synthesis module 133 may generate a first color synthesis signal by synthesizing the first readout signals, generate a second color synthesis signal by synthesizing the second readout signals, generate a third color synthesis signal by synthesizing the third readout signals, and generate a fourth color synthesis signal by synthesizing the fourth readout signals.

The monochrome synthesis module 135 may be enabled in a monochrome synthesis operation mode. The monochrome synthesis module 135 may operate in a high-contrast mode and a low-contrast mode. The monochrome synthesis module 135 may generate monochrome synthesis signals MNs corresponding to a monochrome pattern, on the basis of readout signals corresponding to pixels each having the white filter among the readout signals ROUTs. For example, the monochrome synthesis module 135 may generate a first monochrome synthesis signal by synthesizing first readout signals corresponding to the pixels each having the white filter among the first readout signals, generate a second monochrome synthesis signal by synthesizing second readout signals corresponding to the pixels each having the white filter among the second readout signals, generate a third monochrome synthesis signal by synthesizing third readout signals corresponding to the pixels each having the white filter among the third readout signals, and generate a fourth monochrome synthesis signal by synthesizing fourth readout signals corresponding to the pixels each having the white filter among the fourth readout signals.

The processing module 137 may generate the image IMG on the basis of any of the remosaic signals REs, the color synthesis signals BAs and the monochrome synthesis signals MNs. For example, the processing module 137 may generate the image IMG on the basis of the remosaic signals REs in the remosaic operation mode, generate the image IMG on the basis of the color synthesis signals BAs in the color synthesis operation mode, and generate the image IMG on the basis of the monochrome synthesis signals MNs in the monochrome synthesis operation mode.

Hereinafter, an operation of the image sensing device 100 in accordance with an embodiment, which has the above-described configuration, is described with reference to FIGS. 11 to 13. It is described as an example that the pixel array 110 has the new pattern illustrated in (A) of FIG. 3.

Figure 11:
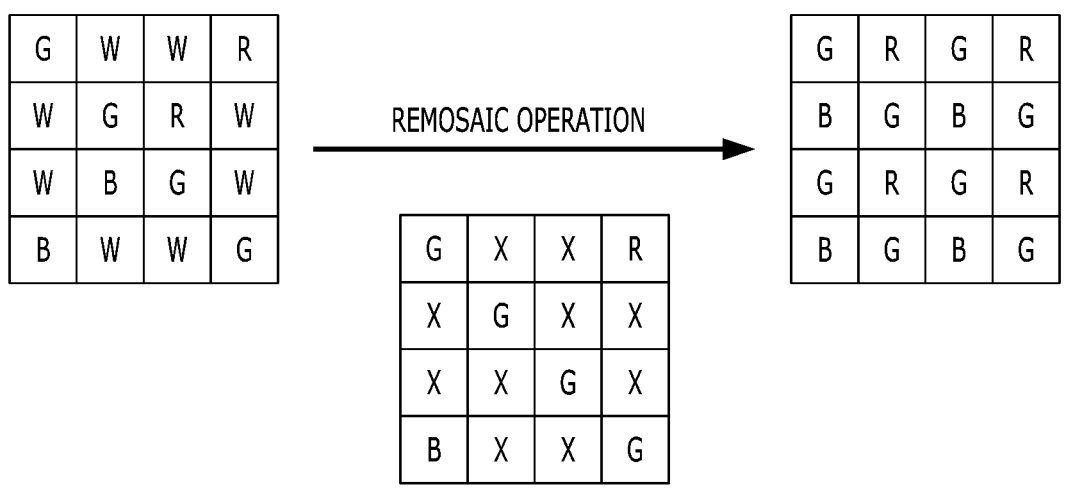
FIG. 11 is a diagram illustrating a remosaic operation according to a remosaic operation mode among the operations of the image sensing device illustrated in FIG. 1 in accordance with an embodiment of the present disclosure.

FIG. 11 is a diagram illustrating a remosaic operation according to a remosaic operation mode among the operations of the image sensing device illustrated in FIG. 1 in accordance with an embodiment of the present disclosure.

Referring to FIG. 11, the remosaic module 131 may convert the readout signals ROUTs corresponding to the new pattern into the remosaic signals REs corresponding to the Bayer pattern. For example, the remosaic module 131 may convert readout signals (marked with "X" in FIG. 11), which are different from the Bayer pattern among the readout signals ROUTs corresponding to the new pattern, through interpolation. Since the remosaic operation of the remosaic module 131 is publicly known and used art, detailed descriptions thereof are omitted.

Figure 12:
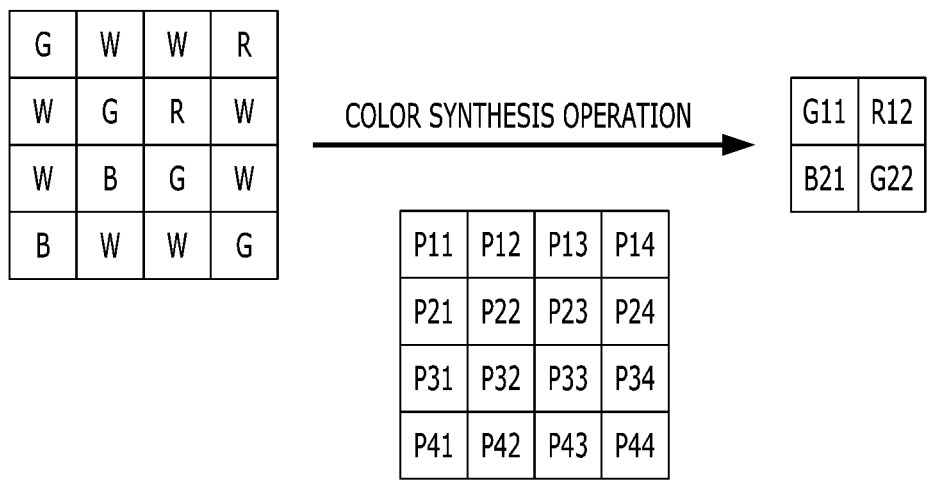
FIG. 12 is a diagram illustrating a color synthesis operation according to a color synthesis operation mode among the operations of the image sensing device illustrated in FIG. 1 in accordance with an embodiment of the present disclosure.

FIG. 12 is a diagram illustrating a color synthesis operation according to the color synthesis operation mode among the operations of the image sensing device illustrated in FIG. 1 in accordance with an embodiment of the present disclosure.

Referring to FIG. 12, the color synthesis module 133 may generate a first color synthesis signal G11 by synthesizing first readout signals P11, P12, P21 and P22 corresponding to the first sub-pixel array among the readout signals ROUTs, generate a second color synthesis signal G22 by synthesizing second readout signals P33, P34, P43 and P44 corresponding to the second sub-pixel array among the readout signals ROUTs, generate a third color synthesis signal R12 by synthesizing third readout signals P13, P14, P23 and P24 corresponding to the third sub-pixel array among the readout signals ROUTs, and generate a fourth color synthesis signal B21 by synthesizing fourth readout signals P31, P32, P41 and P42 corresponding to the fourth sub-pixel array among the readout signals ROUTs. For example, the first color synthesis signal G11 may be calculated by Equation 1 below, the second color synthesis signal G22 may be calculated by Equation 2 below, and the third color synthesis signal R12 may be calculated by Equation 3 below, and the fourth color synthesis signal B21 may be calculated by Equation 4 below.

$$G11 = (P11 + P22) \times \frac{0.5(P12 + P21)}{\sum_{i,j \in ROI} W_{i,j}} \quad \text{[Equation 1]}$$

$$G22 = (P33 + P44) \times \frac{0.5(P34 + P43)}{\sum_{i,j \in ROI} W_{i,j}} \quad \text{[Equation 2]}$$

$$R12 = (P14 + P23) \times \frac{0.5(P13 + P24)}{\sum_{i,j \in ROI} W_{i,j}} \quad \text{[Equation 3]}$$

$$B21 = (P32 + P41) \times \frac{0.5(P31 + P42)}{\sum_{i,j \in ROI} W_{i,j}} \quad \text{[Equation 4]}$$

Herein, "$\sum_{i,j \in ROI} W_{i,j}$" denotes an average value of the readout signals, which correspond to the pixels each having the white filter, in a region of interest that is set with respect to each of the sub-pixel arrays.

The readout signals of the pixels each having the white filter are applied to the first color synthesis signal G11, the second color synthesis signal G22, the third color synthesis signal R12 and the fourth color synthesis signal B21, thereby improving a signal-to-noise ratio (SNR).

Figure 13:
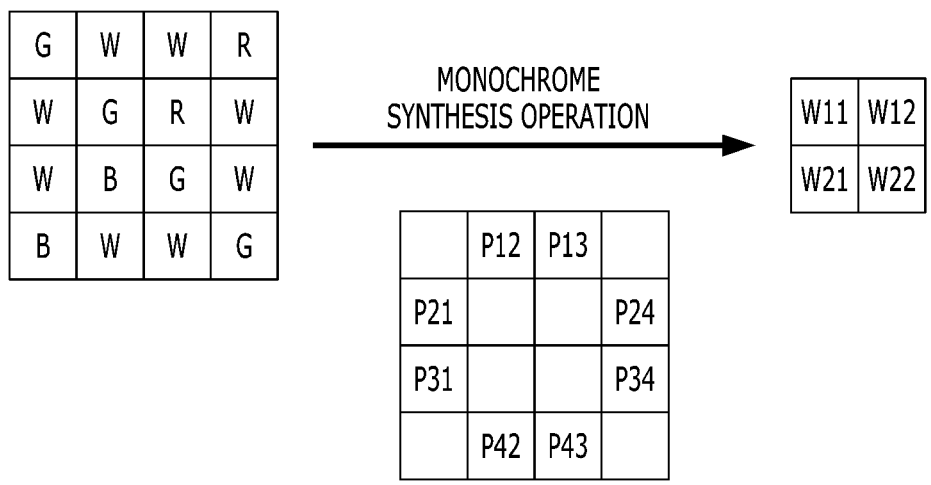
FIG. 13 is a diagram illustrating a monochrome synthesis operation according to a monochrome synthesis operation mode among the operations of the image sensing device illustrated in FIG. 1 in accordance with an embodiment of the present disclosure.

FIG. 13 is a diagram illustrating a monochrome synthesis operation according to the monochrome synthesis operation mode among the operations of the image sensing device illustrated in FIG. 1 in accordance with an embodiment of the present disclosure.

Referring to FIG. 13, the monochrome synthesis module 135 may generate a first monochrome synthesis signal W11 by synthesizing first readout signals P12 and P21 corresponding to the pixels each having the white filter among the first readout signals corresponding to the first sub-pixel array, generate a second monochrome synthesis signal W22 by synthesizing second readout signals P34 and P43 corresponding to the pixels each having the white filter among the second readout signals corresponding to the second sub-pixel array, generate a third monochrome synthesis signal W12 by synthesizing third readout signals P13 and P24 corresponding to the pixels each having the white filter among the third readout signals corresponding to the third sub-pixel array, and generate a fourth monochrome synthesis signal W21 by synthesizing fourth readout signals P31 and P42 corresponding to the pixels each having the white filter among the fourth readout signals corresponding to the fourth sub-pixel array.

According to an embodiment of the present disclosure, as a pixel array having a new pattern is proposed, it is possible to generate an optimal image in a high-contrast mode and a low-contrast mode.

According to an embodiment of the present disclosure, as a pixel array having a new pattern is proposed, it is possible to improve a signal-to-noise ratio (SNR) in a low-contrast mode, support a high-resolution in a high-contrast mode and provide a monochrome image in the low-contrast and high-contrast modes.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensing device comprising:
a pixel array having a 4×4 unit pixel structure,
wherein the pixel array includes:
   a first sub-pixel array including first and second pixels each having a green filter and disposed in a first diagonal direction, and third and fourth pixels each having a white filter and disposed in a second diagonal direction that intersects the first diagonal direction;
   a second sub-pixel array including fifth and sixth pixels each having the green filter and disposed in the first diagonal direction, and seventh and eighth pixels each having the white filter and disposed in the second diagonal direction;
   a third sub-pixel array including ninth and $10^{th}$ pixels each having a red filter and disposed in the second diagonal direction, and $11^{th}$ and $12^{th}$ pixels each having the white filter and disposed in the first diagonal direction; and
   a fourth sub-pixel array including $13^{th}$ and $14^{th}$ pixels each having a blue filter and disposed in the second diagonal direction, and $15^{th}$ and $16^{th}$ pixels each having the white filter and disposed in the first diagonal direction.

2. The image sensing device of claim 1,
wherein the first and second sub-pixel arrays are disposed in the first diagonal direction in the 4×4 unit pixel structure, and
wherein the third and fourth sub-pixel arrays are disposed in the second diagonal direction in the 4×4 unit pixel structure.

3. The image sensing device of claim 1,
wherein the first sub-pixel array is disposed on a top left in the 4×4 unit pixel structure,
wherein the second sub-pixel array is disposed on a bottom right in the 4×4 unit pixel structure,
wherein the third sub-pixel array is disposed on a top right in the 4×4 unit pixel structure, and
wherein the fourth sub-pixel array is disposed on a bottom left in the 4×4 unit pixel structure.

4. The image sensing device of claim 1,
wherein the first sub-pixel array is disposed on a top right in the 4×4 unit pixel structure,
wherein the second sub-pixel array is disposed on a bottom left in the 4×4 unit pixel structure,
wherein the third sub-pixel array is disposed on a bottom right in the 4×4 unit pixel structure, and
wherein the fourth sub-pixel array is disposed on a top left in the 4×4 unit pixel structure.

5. The image sensing device of claim 1,
wherein the first sub-pixel array is disposed on a top right in the 4×4 unit pixel structure,
wherein the second sub-pixel array is disposed on a bottom left in the 4×4 unit pixel structure,
wherein the third sub-pixel array is disposed on a top left in the 4×4 unit pixel structure, and
wherein the fourth sub-pixel array is disposed on a bottom right in the 4×4 unit pixel structure.

6. The image sensing device of claim 1,
wherein the first sub-pixel array is disposed on a top left in the 4×4 unit pixel structure,
wherein the second sub-pixel array is disposed on a bottom right in the 4×4 unit pixel structure,
wherein the third sub-pixel array is disposed on a bottom left in the 4×4 unit pixel structure, and
wherein the fourth sub-pixel array is disposed on a top right in the 4×4 unit pixel structure.

7. The image sensing device of claim 1, further comprising:
- a readout circuit suitable for generating readout signals on the basis of pixel signals outputted from the pixel array; and
- an image processing circuit suitable for generating, on the basis of the readout signals, an image having a different pattern from the 4×4 unit pixel structure.

8. The image sensing device of claim 7, wherein the image processing circuit includes:
- a remosaic circuit suitable for converting first readout signals corresponding to the first sub-pixel array, second readout signals corresponding to the second sub-pixel array, third readout signals corresponding to the third sub-pixel array and fourth readout signals corresponding to the fourth sub-pixel array into first to fourth image signals corresponding to a Bayer pattern, respectively;
- a color synthesis circuit suitable for generating first to fourth image signals, which correspond to the Bayer pattern, by synthesizing the first to fourth readout signals, respectively; and
- a monochrome synthesis circuit suitable for generating first to fourth image signals, which correspond to a monochrome pattern, by synthesizing respective readout signals corresponding to the pixels each having the white filter among the first to fourth readout signals.

9. The image sensing device of claim 8,
wherein the remosaic circuit operates in a high-contrast mode,
wherein the color synthesis circuit operates in a low-contrast mode, and
wherein the monochrome synthesis circuit operates in any of the high-contrast and low-contrast modes.

10. An image sensing device comprising:
a pixel array including N×M pixels, where N and M are natural numbers greater than 2,
wherein the pixel array includes:
- first pixels disposed along a first diagonal line and each having a green filter;
- at least one second pixel having a white filter, at least one third pixel having a red filter and at least one fourth pixel having a blue filter, the second to fourth pixels being disposed along a second diagonal line parallel to the first diagonal line;
- fifth pixels disposed along a third diagonal line parallel to the second diagonal line and each having the white filter; and
- at least one sixth pixel having the white filter, at least one seventh pixel having the red filter and at least one eighth pixel having the blue filter, the sixth to eighth pixels being disposed along a fourth diagonal line parallel to the third diagonal line.

11. The image sensing device of claim 10, wherein the second to fourth pixels disposed along the second diagonal line are disposed in the order of a pixel having the white filter, a pixel having the red filter, a pixel having the white filter and a pixel having the blue filter, or in the order of a pixel having the white filter, a pixel having the blue filter, a pixel having the white filter and a pixel having the red filter.

12. The image sensing device of claim 10, wherein the sixth to eighth pixels disposed along the fourth diagonal line are disposed in the order of a pixel having the red filter, a pixel having the white filter, a pixel having the blue filter and a pixel having the white filter, or in the order of a pixel having the blue filter, a pixel having the white filter, a pixel having the red filter and a pixel having the white filter.

13. The image sensing device of claim 10, wherein the pixel array further includes:
- at least one ninth pixel having the white filter, at least one $10^{th}$ pixel having the red filter and at least one $11^{th}$ pixel having the blue filter, the ninth to $11^{th}$ pixels being disposed along a fifth diagonal line parallel to the first diagonal line;
- $12^{th}$ pixels disposed along a sixth diagonal line parallel to the fifth diagonal line and each having the white filter; and
- at least one $13^{th}$ pixel having the white filter, at least one $14^{th}$ pixel having the red filter and at least one $15^{th}$ pixel having the blue filter, the $13^{th}$ to $15^{th}$ pixels being disposed along a seventh diagonal line parallel to the sixth diagonal line.

14. The image sensing device of claim 13, wherein the ninth to $11^{th}$ pixels disposed along the fifth diagonal line are disposed in the order of a pixel having the white filter, a pixel having the red filter, a pixel having the white filter and a pixel having the blue filter, or in the order of a pixel having the white filter, a pixel having the blue filter, a pixel having the white filter and a pixel having the red filter.

15. The image sensing device of claim 13, wherein the $13^{th}$ to $15^{th}$ pixels disposed along the seventh diagonal line are disposed in the order of a pixel having the red filter, a pixel having the white filter, a pixel having the blue filter and a pixel having the white filter, or in the order of a pixel having the blue filter, a pixel having the white filter, a pixel having the red filter and a pixel having the white filter.

16. The image sensing device of claim 10, further comprising:
- a readout circuit suitable for generating readout signals on the basis of pixel signals outputted from the pixel array; and
- an image processing circuit suitable for generating, on the basis of the readout signals, an image having a different pattern from the pixel array.

17. The image sensing device of claim 16, wherein the image processing circuit includes:
- a remosaic circuit suitable for generating image signals, which correspond to a Bayer pattern, on the basis of the readout signals;
- a color synthesis circuit suitable for generating image signals, which correspond to the Bayer pattern, by synthesizing respective readout signals; and
- a monochrome synthesis circuit suitable for generating image signals, which correspond to a monochrome pattern, by synthesizing respective readout signals corresponding to the pixels each having the white filter among the readout signals.

18. The image sensing device of claim 17,
wherein the remosaic circuit operates in a high-contrast mode,
wherein the color synthesis circuit operates in a low-contrast mode, and
wherein the monochrome synthesis circuit operates in any of the high-contrast and low-contrast modes.

19. An image sensing device comprising:
a pixel array having a K×K unit pixel structure, where K is a natural number greater than wherein the unit pixel structure includes:
- first pixels disposed in a first diagonal direction and each having a green filter;
- second pixels each having a red filter and third pixels each having a blue filter, the second and third pixels being disposed in a second diagonal direction that intersects the first diagonal direction, wherein the second pixels are consecutively disposed on one side of the second diagonal direction and wherein the third pixels are consecutively disposed on the other side of the second diagonal direction; and fourth pixels each having a white filter and disposed at the other positions except for arrangement positions of the first to third pixels disposed in the first and second diagonal directions.

\* \* \* \* \*